United States Patent [19]
Butterfield et al.

[11] 4,103,968
[45] Aug. 1, 1978

[54] SEAT COVER

[75] Inventors: Max E. Butterfield, Peoria; John Molnar, Aurora, both of Ill.

[73] Assignee: Caterpillar Tractor Co., Peoria, Ill.

[21] Appl. No.: 804,976

[22] Filed: Jun. 9, 1977

[51] Int. Cl.² ............................................. A47C 31/10
[52] U.S. Cl. ...................................... 297/219; 297/284
[58] Field of Search ................... 297/219, 229, 284; 5/353.1

[56] References Cited

U.S. PATENT DOCUMENTS

| | | | |
|---|---|---|---|
| 1,763,001 | 6/1930 | Masury | 297/219 |
| 2,229,160 | 1/1941 | Wittcoff | 297/219 X |
| 2,833,341 | 5/1958 | Bornstein | 297/229 |
| 3,273,937 | 9/1966 | Anderson | 297/219 |
| 3,278,226 | 10/1966 | Magnusson | 297/219 |
| 3,515,430 | 6/1970 | Nelson | 297/219 X |
| 3,596,989 | 8/1971 | Van Ryn | 297/219 |

Primary Examiner—Francis K. Zugel
Attorney, Agent, or Firm—Phillips, Moore, Weissenberger, Lempio & Majestic

[57] ABSTRACT

A seat cover apparatus includes a seat back cover portion, and a seat bottom cover portion, each defining in free form a plurality of elongated ribs positioned to seat generally within respective depressions of the seat back portion and seat bottom portion.

2 Claims, 4 Drawing Figures ypto
SEAT COVER

BACKGROUND OF THE INVENTION

This invention relates to seat covers, and more particularly to individual seat covers for a seat having a seat back and a seat bottom.

Generally, the outer surfaces of the seats of, for example, a tractor or the like, become heavily soiled after extended periods of usage. For this reason, it is highly advantageous to provide some form of seat cover which can be easily and conveniently removed from time to time, and then replaced for proper usage.

While the utility of such a seat cover is readily apparent, it should be understood that the cover itself must be capable of being fitted in a secure and stable manner, meanwhile providing comfort for the operator of the vehicle.

SUMMARY OF THE INVENTION

The present invention is directed to overcoming one or more of the problems as set forth above.

Broadly stated, the invention comprises a seat cover for a seat portion, having in free form a plurality of elongated depressions therein, the seat cover comprising a seat cover body, having in free form a plurality of elongated ribs thereon, positioned to seat generally within respective depressions of a seat portion with the seat cover body fitted to a seat portion.

BRIEF DESCRIPTION OF THE DRAWINGS

Other objects of the invention will become apparent from a study of the following specification and drawings, in which.

DESCRIPTION OF THE PREFERRED EMBODIMENT

Figure 1:
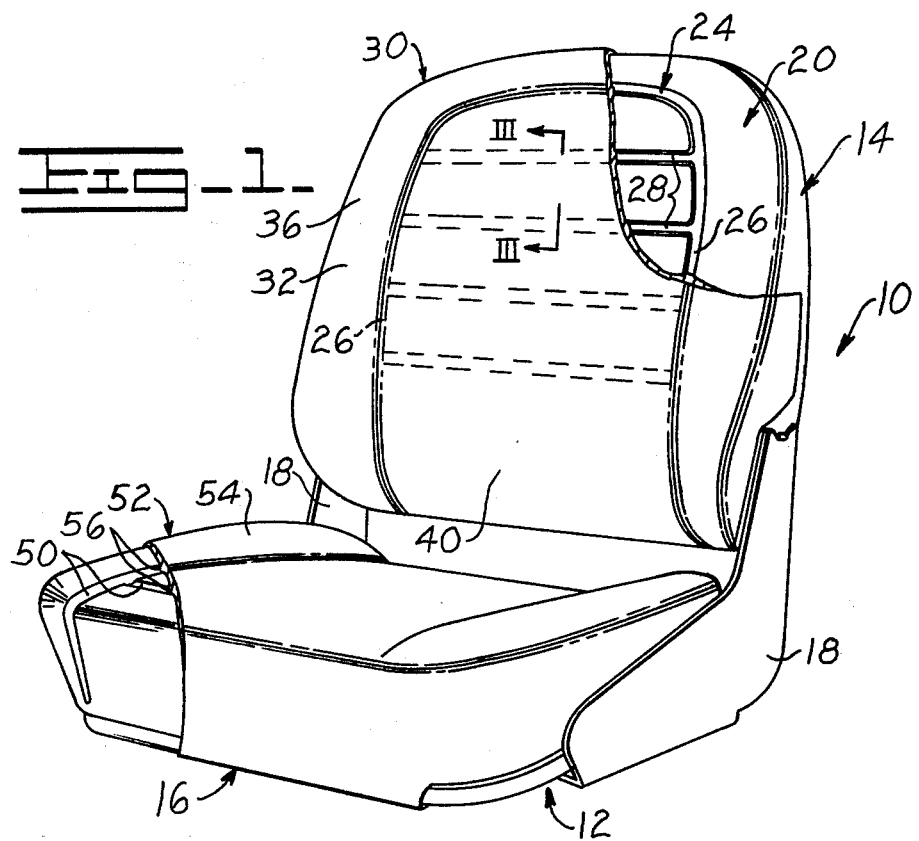
FIG. 1 is a first perspective view of an apparatus incorporating the invention.
Figure 2:
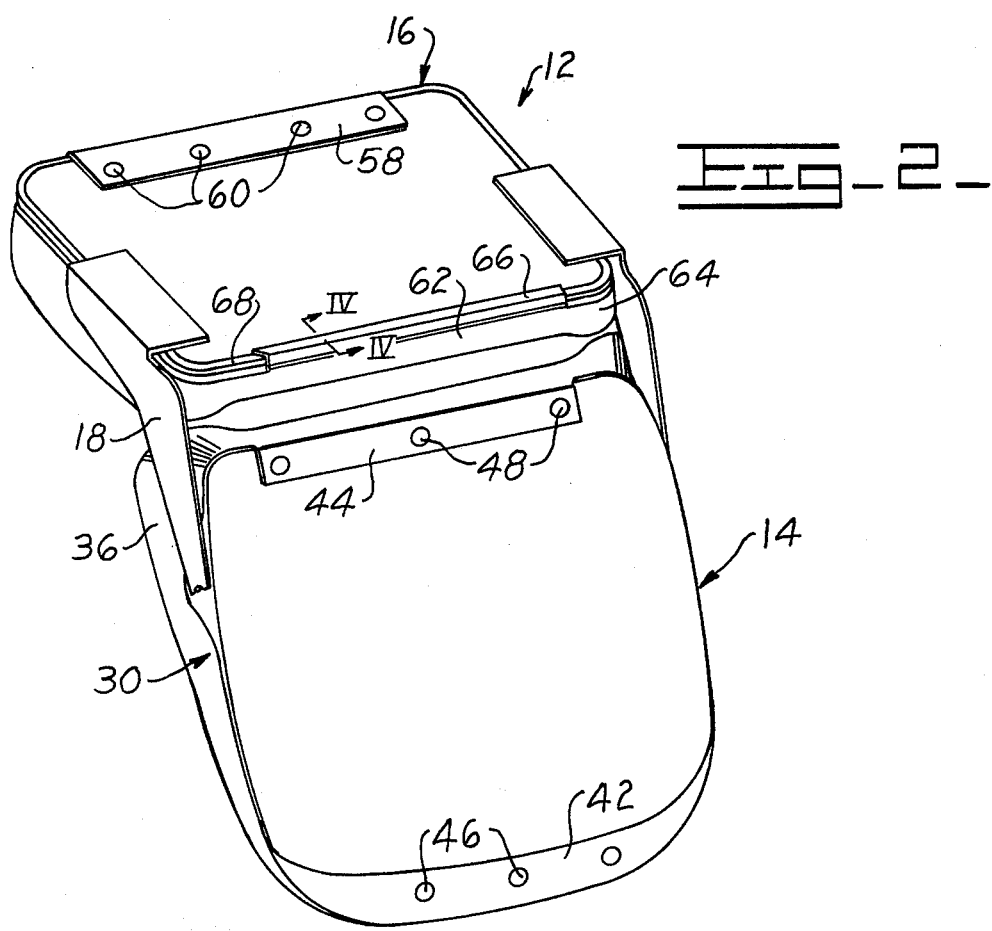
FIG. 2 is another perspective view of the apparatus of FIG. 1, incorporating the invention.

Shown in FIGS. 1 and 2 is the overall seat apparatus 10. Such apparatus includes a seat 12, having a seat portion 14 and a seat portion 16, the seat portion 14 actually being a seat back and the seat portion 16 actually being a seat bottom. The seat back 14 and seat bottom 16 are connected by brace means 18 along opposite sides thereof, as is well known.

Figure 3:
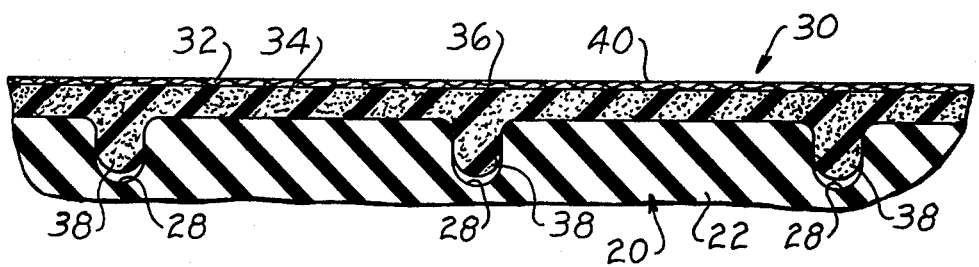
FIG. 3 is a sectional view taken along the lines III—III of FIG. 1.

The seat back outer portion 20 is of rubber material 22 as shown in FIG. 3 and defines in free, i.e., uncompressed or unstretched form, a plurality of elongated depressions 24 therein. The plurality of depressions 24 include a pair of generally upwardly extending depressions 26, spaced apart and in generally parallel relation. Such depressions are connected by a plurality of generally horizontal depressions 28 as shown.

A seat cover 30 for the seat portion 14 is shown. The seat cover 30 is made of a seat cover body 32 in turn made up of an inner portion 34 of sponge rubber and an outer cloth or fabric portion 36 secured thereto. The inner portion 34 defines in free form a plurality of elongated ribs 38 thereof, which comform to the depressions 26, 28 defined by the seat portion 14. That is, the ribs 38 are positioned to seat generally within respective corresponding depressions 26, 28 of the seat portion 14 with the seat cover body 32 fitted to the seat portion 14, as will be further described.

The seat cover body fabric 36 defines a generally smooth outer surface 40.

As shown in FIG. 2, the seat cover body 32 includes a top edge portion and a bottom edge portion, at flaps 42 and 44.

Snap means in the form of snap heads 46 are mounted adjacent the top edge portion on the flap 42 and snap means in the form of snap heads 48 are mounted adjacent the bottom edge portion on the flap 44. The back surface of the seat portion 14 has mounted thereto corresponding snap bases (not shown) to which the snap heads 44, 46 can be secured, so that the seat cover body 32 can be mounted to the seat portion 14 and secured thereto by the means of the snap means described above.

In a generally similar manner, the seat portion 16 has in free form a plurality of elongated depressions 50 therein and further included is a seat cover 52 having a seat cover body 54 having in free form a plurality of elongated ribs 56 thereon. The material of the seat portion 16 defining such elongated depressions 50, and the material of the seat cover body 54 are similar to those described above. Also similar to the above, the ribs 56 are so positioned as to be seated generally within the respective depressions 50 of the seat portion with the seat cover body 54 fitted to the seat portion 16.

Figure 4:
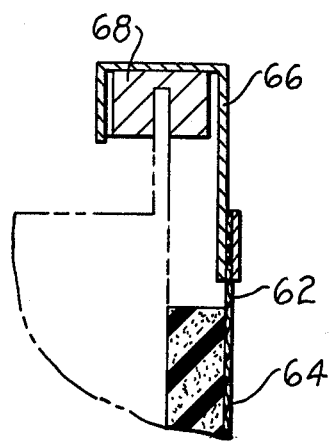
FIG. 4 is a sectional view taken along the lines IV—IV of FIG. 2.

The seat cover body 54 includes a forward edge portion including a flap 58 having snap heads 60 mounted thereto which are positioned for engagement with snap bases (not shown) mounted adjacent the forward portion of and along the bottom of the seat portion 16. The seat cover body 54 also defines a rearward edge portion 62, actually being made up of a portion of the fabric 64 of the body 54 (FIG. 4). Secured to the fabric 64 is a generally hooked-shaped member 66. The hooked-shaped member 66 is designed to be mounted to and generally about a metal rod 68 secured to the lower rearward edge of the seat portion 16, as best shown in FIG. 4.

For mounting the seat cover body 54, such seat cover body 54 is generally positioned in place and the generally hooked-shaped member 66 is disposed under and generally about the rod 68. The seat cover body is stretched forwardly of the seat portion 16, until the flap 56 is positioned to secure the flap 58 to the seat portion 16 by means of the snap means.

Through such apparatus, it will be seen that the seat cover bodies 32, 54 may be easily and conveniently fitted to the seat portions 14, 16 in a highly stable and effective manner. Meanwhile, such seat cover bodies 32, 54 may be easily removed and replaced as desired.

The embodiments of the invention in which an exclusive property or privilege is claimed are defined as follows:

1. A seat cover for a seat portion having in free form a plurality of elongated depressions therein, comprising a seat cover body having in free form a plurality of of elongated ribs thereon, positioned to seat generally within respective depressions of the seat portion with the seat cover body fitted to the seat portion, said seat cover including means for removably securing said seat cover body to the seat portion, wherein said seat cover is readily removable from and readily positionable on the seat portion, said seat cover body having a generally smooth outer surface, and wherein the seat cover body includes a forward edge portion and a rearward edge portion, and further wherein said securing means comprises snap means mounted to the seat cover body adjacent the forward edge portion for securing the forward edge portion of the seat cover body to the seat portion, and said securing means also comprises generally hook-shaped means mounted to the seat cover body adjacent the rearward edge portion for securing the rearward edge portion of the seat cover body to the seat portion, wherein said hook-shaped means includes a continuous U-shaped channel substantially co-existent with the rearward edge portion of said seat cover body.

2. The apparatus of claim 1 wherein said seat cover comprises flexible material.

* * * * *